2,895,968

$\Delta^{7,9}$ BISNORCHOLADIENIC ACIDS AND ESTERS THEREOF

William V. Ruyle, Westfield, N.J., assignor to Merck & Co., Inc., Rahway, N.J., a corporation of New Jersey No Drawing. Application April 30, 1954
Serial No. 426,915

1 Claim. (Cl. 260—397.1)

This invention relates to novel cyclopentanopolyhydrophenanthrene compounds; more particularly it relates to novel cyclopentanopolyhydrophenanthrene compounds having conjugated double bonds in the 7:8 and 9:11 positions; and specifically it relates to the preparation of the novel compounds, 3-hydroxy-$\Delta^{7,9(11)}$-bisnorallocholadienic acid, $\Delta^{7,9(11)}$-allopregnadiene-3-ol-20-one, and derivatives thereof.

This application is a continuation-in-part of my copending application Serial No. 216,251, filed March 17, 1951, and now abandoned.

Cyclopentanopolyhydrophenanthrene compounds having conjugated double bonds in the 7:8 and 9:11 positions are useful as starting materials for the preparation of steroid compounds having functional groups, such as hydroxy or keto, in ring C at the 11 position. This process for the introduction of substituents in the 11 position is described in the copending application Serial No. 215,026, filed March 10, 1951, and now abandoned.

It is an object of the present invention to provide novel cyclopentanopolyhydrophenanthrene compounds having unsaturated double bonds in the 7:8 and 9:11 positions, and processes for the preparation of these compounds. It is a further object to provide a method for the preparation of the new compound, 3-hydroxy-$\Delta^{7,9(11)}$-bisnorallocholadienic acid and derivatives thereof, by reacting 3-acyloxy-$\Delta^{7}$-bisnorallocholenic acid esters with mercuric acetate. Another object is to provide the novel compound $\Delta^{7,9(11)}$-allopregnadiene-3-ol-20-one, and 3-acyloxy derivatives thereof, by the reaction of mercuric acetate with acyl derivatives of $\Delta^{7}$-allopregnenolone. Other objects will be apparent from the detailed description hereinafter provided.

In accordance with one embodiment of my invention, I have found that an ester of 3-acyloxy-$\Delta^{7,9(11)}$-bisnorallocholadienic acid is obtained by reacting the corresponding ester of 3-acyloxy-$\Delta^{7}$-bisnorallocholenic acid with mercuric acetate in acetic acid. In carrying out this reaction, I find that the conversion is preferably effected by dissolving the starting material in a suitable inert solvent, such as chloroform, and slowly adding thereto a solution of mercuric acetate in acetic acid at room temperature. In order to insure completion of the reaction, the resulting reaction mixture is allowed to stir at room temperature for about 16 hours. The desired $\Delta^{7,9(11)}$-compound is then readily and conveniently recovered by filtering the reaction mixture to remove the precipitated mercurous acetate, washing the resulting chloroform-acetic acid solution with water to remove the acetic acid, and evaporating the chloroform solution under diminished pressure. The residue so obtained can be readily purified by crystallization from a suitable solvent, such as methanol or acetone, to obtain the desired $\Delta^{7,9(11)}$-compound in pure crystalline form.

The 3-acyloxy-$\Delta^{7,9(11)}$-bisnorallocholadienic acid esters are then readily hydrolyzed by heating with alkali to obtain 3-hydroxy-$\Delta^{7,9(11)}$-bisnorallocholadienic acid. The free acid can be esterified and/or acylated to obtain other derivatives in accordance with methods known in the art.

Although any ester of 3-acyloxy-$\Delta^{7}$-bisnorallocholenic acid is suitable as a starting material for the preparation of the corresponding $\Delta^{7,9(11)}$-compound, I generally prefer to utilize a lower alkyl ester such as the methyl, ethyl or propyl ester since these esters are readily and conveniently prepared. Similarly, while various acyl derivatives of 3-hydroxy-$\Delta^{7}$-bisnorallocholenic acid are useful in the process of my invention, I have found that it is preferable to employ a lower aliphatic acyl derivative, such as the 3-acetoxy or 3-propionoxy derivative, since such derivatives result in the obtainment of maximum yields of the desired $\Delta^{7,9(11)}$-compound under optimum conditions. Suitable starting materials that might be mentioned include methyl 3-acetoxy-$\Delta^{7}$-bisnorallocholenate, ethyl 3-propionoxy-$\Delta^{7}$-bisnorallocholenate, ethyl 3-acetoxy-$\Delta^{7}$-bisnorallocholenate and the like.

Pursuant to a further embodiment of my invention, I have found that when 3-acyloxy-$\Delta^{7}$-allopregnenolone is reacted with a solution of mercuric acetate in acetic acid, the corresponding 3-acyloxy-20-keto-$\Delta^{7,9(11)}$-allopregnadiene is formed. This reaction is also conveniently effected at room temperature by adding a solution of mercuric acetate an acetic acid to a solution of the $\Delta^{7}$-allopregnenolone derivative in a suitable organic solvent such as chloroform. The resulting 3-acyloxy-20-keto-$\Delta^{7,9(11)}$-allopregnadiene is recovered in the same manner described above for the $\Delta^{7,9(11)}$-bisnorallocholadienic acid compounds.

The acyl derivatives of $\Delta^{7,9(11)}$-allopregnadiene-3-ol-20-one can be readily hydrolyzed with alkali to obtain $\Delta^{7,9(11)}$-allopregnadiene-3-ol-20-one which can be acylated to form other 3-acyloxy derivatives in accordance with methods known in the art.

While the various acyl derivatives of $\Delta^{7}$-allopregnenolone are suitable as starting materials in my process for preparing the corresponding $\Delta^{7,9(11)}$-compound, I ordinarily prefer to use a lower aliphatic acid derivative, such as the 3-acetoxy or 3-propionoxy compounds since these derivatives are readily and conveniently prepared.

The novel compounds of the present invention are valuable intermediates which can be employed in the synthesis leading to the preparation of biologically active 11-keto steroids, such as cortisone. For example, methyl 3-acetoxy-$\Delta^{7,9(11)}$-bisnorallocholenate is converted to the corresponding epoxide derivative by reaction with perbenzoic acid in benzene. The epoxide is recovered by concentrating the reaction mixture under diminished pressure and crystallizing the residue from acetone. Upon contacting the epoxide in benzene solution with a column of acid-washed alumina and then eluting the alumina first with ether and finally with a mixture of acetone-ether (1:2½ and 3:2), the methyl 3-acetoxy-7,11-dihydroxy-$\Delta^{8}$-bisnorallocholanate formed is recovered from the acetone-ether eluates. Oxidation of the methyl 3-acetoxy-7,11-dihydroxy-$\Delta^{8}$-bisnorallocholenate with chromic acid in glacial acetic acid yields methyl 3-acetoxy-7,11-diketo-$\Delta^{8}$-bisnorallocholenate which on reduction with zinc in acetic acid is reduced to methyl 3-acetoxy-7,11-diketo bisnorallocholanate. The latter compound is then reduced by reaction with hydrazine hydrate and potassium hydroxide in ethylene glycol at elevated temperatures, and the resulting reaction product acidified to obtain methyl 3-hydroxy-11-keto bisnorallocholanate. By the same series of reactions $\Delta^{7,9(11)}$-3-acetoxy-20-keto allopregnadiene can be converted to 3-hydroxy-11,20-diketo allopregnadiene. These reactions are described in detail in the copending application of Earl M. Chamberlin and John M. Chemerda, Serial No. 215,026, filed March 10, 1951.

The methyl 3-hydroxy-11-keto bisnorallocholanate and the 3-hydroxy-11,20-diketo allopregnane, and the esters thereof, can be converted to biologically active 11-keto steroids, such as cortisone. Thus, the side chain at C–17 of 3-hydroxy-11-keto bisnorallocholanic acid and the esters and acylated derivatives thereof can be degraded by the application of the Barbier-Wieland method to obtain 3-hydroxy-11,20-diketo allopregnane. For example, methyl 3-acetoxy-11-keto-bisnorallocholanate can be reacted with phenylmagnesium bromide in benzene to form the corresponding 22-hydroxy-22,22-diphenyl compound which on dehydration with acetic acid to the $\Delta^{21}$-22,22-diphenyl compound followed by oxidation with ozone yields 3-hydroxy-11,20-diketo allopregnane. Upon reacting the latter compound with lead tetraacetate in glacial acetic acid 3,21-diacetoxy-11,20-diketo allopregnane is obtained. Reaction of this compound with hydrogen cyanide in ethanol yields the cyanohydrin, 3,21-diacetoxy-11-keto-20-hydroxy-20-cyanoallopregnane which on dehydration with phosphorous oxychloride in the presence of pyridine is converted to the $\Delta^{17(20)}$-20-cyano compound and is then partially esterified by reaction with acetic anhydride to form the corresponding 21-acetoxy ester. Oxidation of this 21-acetoxy ester by reaction with chromic acid in acetic acid affords the corresponding 3-keto compound, $\Delta^{17(20)}$-3,11-diketo-20-cyano-21-acetoxy allopregnene. Treatment of this compound with osmium tetroxide in dry pyridine forms the 17,20-osmate ester which on reaction with sodium sulfite is cleaved to form 3,11,20-triketo-17-hydroxy-21-acetoxy allopregnane. Bromination of the latter compound affords the 2,4-dibromo compound which on treatment with sodium iodide in acetone solution is converted to the corresponding 2-iodo compound. Reaction of this iodo compound with chromous chloride yields cortisone acetate. By the series of reactions indicated above 3-hydroxy-11,20-diketo allopregnane can be similarly converted to cortisone.

The following examples are presented to illustrate specific embodiments of my invention.

EXAMPLE 1

*Preparation of methyl 3-acetoxy-$\Delta^{7,9(11)}$-bisnorallocholadienate from methyl 3-acetoxy-$\Delta^{7}$-bisnorallocholenate*

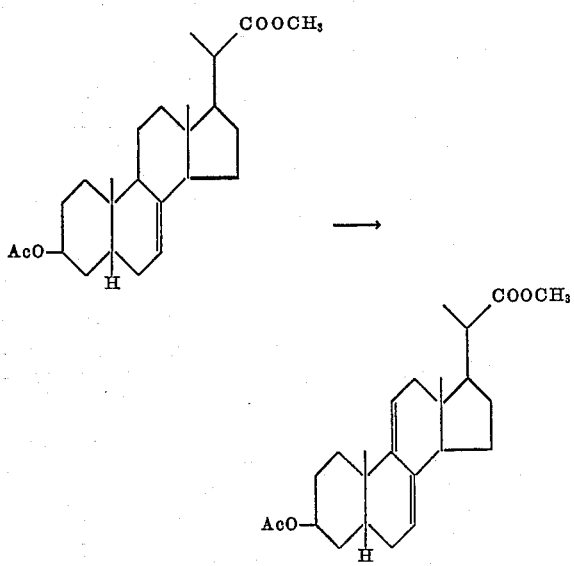

To a stirred solution of 16.75 g. of methyl 3-acetoxy-$\Delta^{7}$-bisnorallocholenate in 235 ml. of chloroform was added a solution of 31.8 g. of mercuric acetate in 525 ml. of acetic acid over a period of 30 minutes. After stirring the mixture overnight, the precipitated mercurous acetate was removed by filtration. The filtrate was shaken with two liters of water, the layers were separated. The aqueous layer was extracted with chloroform. The combined chloroform extracts were washed with water, and dried over anhydrous sodium sulfate. The chloroform was removed by vacuum distillation. The residual oily material was triturated with methanol and filtered to yield 11.03 g. of crystalline methyl 3-acetoxy-$\Delta^{7,9(11)}$-bisnorallocholadienate, M.P. 132–148° C. After several recrystallizations from methanol and from acetone, the melting point rose to 162.5–165° C. Analysis of the product indicated that it was solvated with one mol of acetone.

*Analysis.*—Calc'd for $C_{25}H_{36}O_4 \cdot C_3H_6O$: C, 73.32; H, 9.23. Found: C, 73.33; H, 9.08.

$[\alpha]_D^{24}+54.7$ (C=1.077 in $CHCl_3$).

Ultraviolet absorption: $\lambda$ max. 2500 A., 2425, 2350; E percent 310, 471, 424. (Ethanol solvent).

The methyl 3-acetoxy-$\Delta^{7}$-bisnorallocholenate used as the starting material in this example can be prepared by reacting methyl 3-acetoxy-$\Delta^{5}$-bisnorallocholenate with N-bromosuccinimide in petroleum ether solution illuminated with a photo-flood lamp, to form the corresponding 7-bromo derivative, heating the bromo derivative with gamma-collidine to produce methyl 3-acetoxy-$\Delta^{5,7}$-bisnorcholadienate, and selectively hydrogenating this compound with hydrogen in the presence of Raney nickel to obtain methyl 3-acetoxy-$\Delta^{7}$-bisnorallocholenate. These reactions are described in detail in the copending application of John M. Chemerda and William V. Ruyle, Serial No. 213,807, filed March 3, 1951, now Patent No. 2,840,574, issued June 24, 1958.

Alternatively, any 3-acyloxy-$\Delta^{7}$-bisnorallocholenic acid ester can be converted to the corresponding $\Delta^{7,9(11)}$-diene compound.

The methyl 3-acetoxy-$\Delta^{7,9(11)}$-bisnorallocholenate so obtained can be hydrolyzed with alkali to obtain the free acid, 3-hydroxy-$\Delta^{7,9(11)}$-bisnorallocholadienic acid. The free acid can be acylated to prepared the 3-acyloxy derivatives, or esterified to form the corresponding esters in accordance with conventional methods known in the art.

EXAMPLE 2

*Preparation of 3-acetoxy-20-keto-$\Delta^{7,9(11)}$-allopregnadiene from $\Delta^{7}$-allopregnenolone acetate*

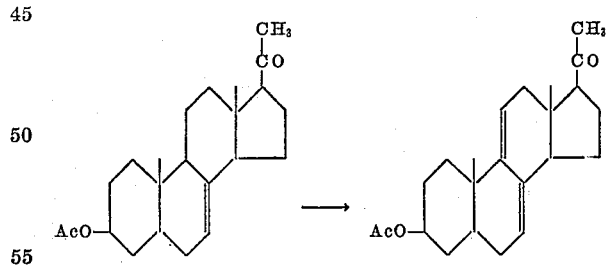

To a solution of 6.4 g. (0.0178 mol) of $\Delta^{7}$-allopregnenolone acetate in 100 ml. of chloroform was added a solution of 13.6 g. (0.0427 mol) of mercuric acetate in 200 ml. of glacial acetic acid, and the mixture was stirred overnight.

The mercurous acetate which had formed was removed by filtration, and the filtrate was shaken twice with 400 ml. portions of water. The chloroform layer was separated and was dried over sodium sulfate. After removal of the solvent by vacuum distillation, the syrupy residue was triturated with methanol to obtain a crystalline product, wt. 4.88 g.; M.P. 130–159° C. By recrystallization from ethanol (abs.) 3.45 g. of elongated prisms were obtained; M.P. 155–159° C. $[\alpha]_D^{24}+43.6°$ (C=1.09 in $CHCl_3$). $\lambda$ max. 2350, 2420, 2500;

$E_{1cm}^{1\%}$ 356, 396, 273

The $\Delta^{7}$-allopregnenolone acetate used as the starting material in this example can be prepared by acetylating $\Delta^5$-3-hydroxy-20-keto pregnene with acetic anhydride to produce the 3-acetoxy compound, heating this compound with N-bromosuccinamide in carbon tetrachloride while illuminating the reaction mixture with a photoflood light to obtain $\Delta^5$-3-acetoxy-7-bromo-20-keto pregnene, reacting this compound with dimethylaniline on the steam bath to produce $\Delta^{5,7}$-3-acetoxy-20-keto pregnadiene, and selectively hydrogenating this diene in the presence of Raney nickel to yield $\Delta^7$-3-acetoxy-20-keto allopregnene ($\Delta^7$-allopregnenolone acetate). These reactions are described in detail in the copending application of John M. Chemerda and William V. Ruyle, Serial No. 213,807, filed March 3, 1951, now Patent No. 2,840,574, issued June 24, 1958.

Various changes and modifications may be made in carrying out the present invention without departing from the spirit and scope thereof. Insofar as these changes and modifications are within the purview of the annexed claim, they are to be considered as part of my invention.

I claim:

A $\Delta^{7,9(11)}$ compound of the formula

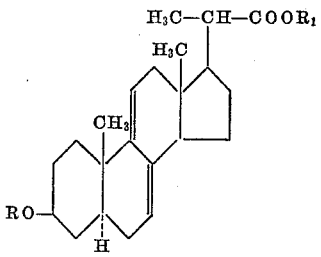

wherein R is a member from the group consisting of hydrogen and lower fatty acid radicals and $R_1$ is a member from the group consisting of hydrogen and lower alkyl groups.

References Cited in the file of this patent

Djerassi: Jour. Org. Chem., 16, 754–760 (1951).
Heusser: Helv. Chim. Acta., 34, 2106–2132 (1951).